Nov. 18, 1969 A. TRONNIER ET AL 3,479,117
OPTICAL CONDENSER SYSTEM
Filed June 2, 1966 2 Sheets-Sheet 1

INVENTORS
ALBRECHT W. TRONNIER
HELMUTH M. JEREMIAS
ARTHUR H. GOTTESMAN

BY
Pennie, Edmonds, Morton, Taylor & Adams
ATTORNEYS

Nov. 18, 1969   A. W. TRONNIER ET AL   3,479,117
OPTICAL CONDENSER SYSTEM
Filed June 2, 1966   2 Sheets-Sheet 2
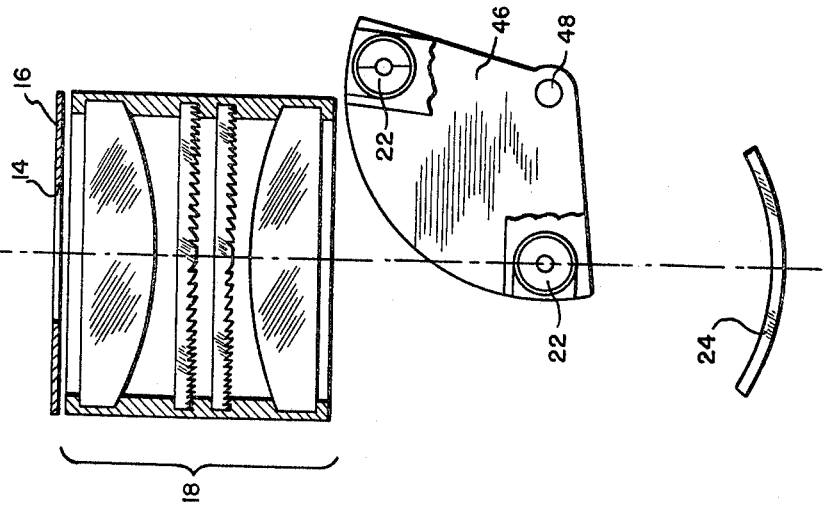
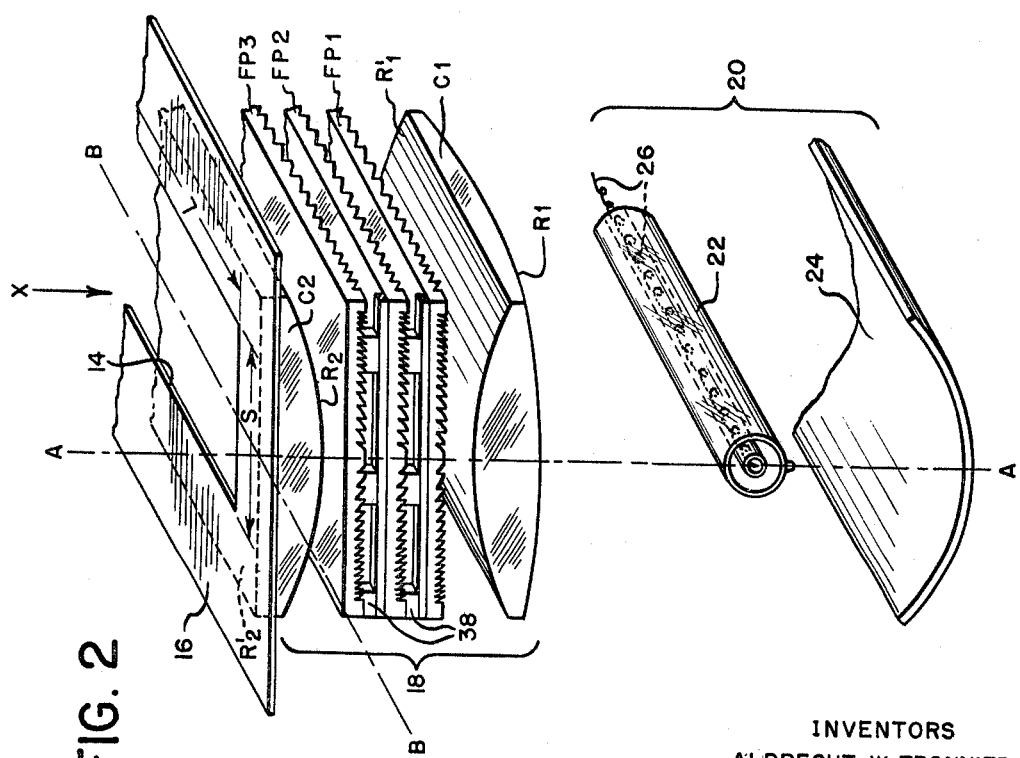
INVENTORS
ALBRECHT W. TRONNIER
HELMUTH M. JEREMIAS
ARTHUR H. GOTTESMAN
BY
Pennie, Edmonds, Morton, Taylor & Adams
ATTORNEYS United States Patent Office 3,479,117
Patented Nov. 18, 1969

3,479,117
OPTICAL CONDENSER SYSTEM
Albrecht W. Tronnier, Goettingen, Germany, and Helmuth M. Jeremias, Bronx, and Arthur H. Gottesman, Yonkers, N.Y., assignors to Farrand Optical Co., Inc., Bronx, N.Y., a corporation of New York
Filed June 2, 1966, Ser. No. 554,768
Int. Cl. G03b 21/20
U.S. Cl. 353—102                                    9 Claims

ABSTRACT OF THE DISCLOSURE

A condensing lens system for use in optical image projection systems. The condenser lens system is adapted to uniformly illuminate objects having a relatively large ratio of length to width. The system comprises a plurality of air-spaced lenses, at least one of which has unequal dioptric power in two perpendicular meridians and a plurality of Fresnel plates of positive power disposed between the two air-spaced lenses.

---

The present invention relates to optical image projection systems, and more particularly to condensers for illumination in such systems of the object of which an image is to be projected. The invention provides a condenser especially adapted to the uniform illumination of objects having a relatively large ratio of length to width. This ratio will for convenience hereinafter be referred to as the aspect ratio of the object, although the terms "length" and "width" are to be understood as interchangeable.

The invention provides a condenser effecting desirably uniform illumination of an object of which the aspect ratio may be as high as 25. The invention is thus adapted to use in the projection of images of such objects as charts or graphs having widely different transverse dimensions, such objects being sometimes hereinafter referred to as "strip-shaped."

In the use of the condenser system of the invention, a projection lens or objective is disposed between the strip-shaped object to be imaged and the screen or other surface onto which an image thereof is to be projected. The objective lens may be combined with mirrors or prisms for deviation of the rays, with or without reversion or inversion of the image. The condenser is disposed on the side of the object remote from the objective, and a source of illumination is disposed behind the condenser, i.e. on the side thereof remote from the object. This source of illumination, which in more particular aspects of the invention constitutes a part of the invention, comprises a lamp of suitable dimensions, advantageously with an associated mirror behind it. The condenser may be disposed in a housing having a light transmitting aperture on the side thereof adjacent the strip-shaped object. The dimensions of this opening define what may be called an image window, and the opening may be established by a diaphragm constituting part of the condenser housing or which may be separate therefrom.

The invention will now be described in further detail by reference to the accompanying drawings in which:

FIG. 2 is a fragmentary perspective view of the optical components of the system of FIG. 1; and FIGS. 3 and 4 are sectional views illustrating modified embodiments of the invention.

Figure 1:
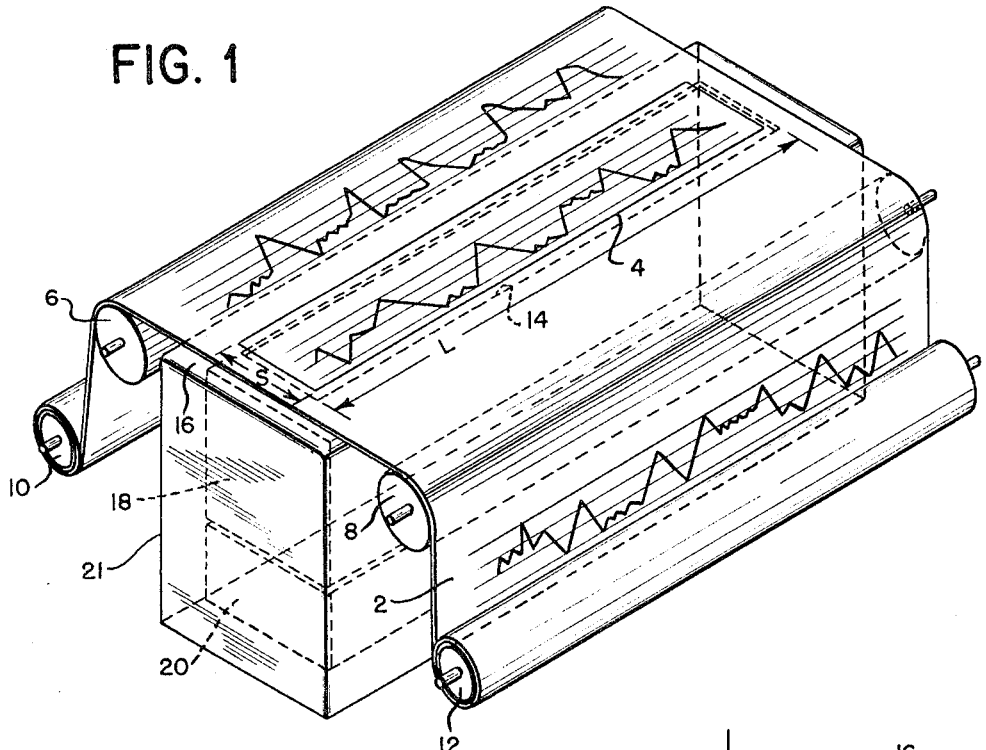
FIG. 1 is a perspective view of an object-illuminating system according to the invention.

Referring to FIG. 1, there is shown a band or strip 2 of film or similar transparent or translucent material having thereon a plurality of strip-shaped pictures or charts whose long dimension extends transversely of the length of the strip 2. One of these pictures or charts is contained within the rectangular outline indicated at 4 on the strip. The reference character 4 will hereinafter be employed to designate the rectangular area within that outline and will sometimes be referred to as the picture of object."

The strip 2 passes via guide rolls 6 and 8 from a supply roll 10 to a take-up roll 12 or vice versa. The picture 4 is centered over and substantially matches in dimensions a rectangular aperture or "image-window" 14 in an opaque mask or diaphragm 16 and defines the limits of the object to be illuminated by the condenser system of the invention. Behind the mask 16 are disposed the condenser, diagrammatically indicated by means of a dash-line box 18, and an illumination source diagrammatically indicated by means of a dash-line box 20. If desired, the mask 16 may form one end of a housing 22, within which the condenser and illumination source may be disposed.

The ratio of the long dimension L to the short dimension S of the picture 4 and more particularly of the image window 14 is the aspect ratio of the object being illuminated. The invention permits the aspect ratio to assume values widely departing from unity, as already indicated.

Referring now to FIG. 2, the mask 16, condenser 18 and illumination source 20 of FIG. 1 are shown in fragmentary perspective. The mask 16 is located vertically above and spaced from the refracting elements of the condenser. The source of illumination includes a lamp 22 and a mirror 24. The lamp is tubular in shape, parallel to the long dimension L of the image window 14, and it advantageously includes a filament 26 wound in a spiral or otherwise formed to have a substantial diameter which is however small by comparison with the length of that filament parallel to the long dimension L.

In accordance with one feature of the invention, the length of the filament parallel to the long dimension L of the image window is a multiple of that length L between $1/\sqrt{10}$ and $\sqrt{10}$. Identifying the length of the filament as $L_t$, the relation of that length to the long dimension L of the image window can be expressed as follows:

$$L/\sqrt{10} < L_t < L\sqrt{10}$$

The mirror 24 is advantageously cylindrical in shape, the elements of that cylindrical shape being parallel to the long dimension of the filament 26 and likewise to the long dimension L of the image window. The length of the mirror is according to another feature of the invention between 75% and 125% of the length of the filament. Identifying the length of the mirror as $L_m$, this relationship can be expressed as follows:

$$.75L < L_m < 1.25L$$

The condenser 18 is disposed between the lamp 22 and the image window 14 in the mask 16. It comprises two lens elements C1 and C2, for example of glass, whose external shape approximates that of the image window. At least one air glass surface of one of these elements is shaped to possess cylindrical power. This is advantageously achieved by giving to it a cylindrical surface although a toroidal surface may be employed instead. In the embodiment shown, the element C1 has a spherical surface of radius $R_1$ adjacent the source 22 of illumination and a cylindrical surface of radius $R_1'$ on the side remote therefrom. The element C2 has a cylindrical surface of radius $R_2$ adjacent the source 22 and a plane surface of infinite radius $R_2'$ remote therefrom.

Between the elements C1 and C2 are disposed a plurality of Fresnel plates FP1, FP2 and FP3 of positive power. These may be of molded construction, made by a molding process from transparent plastic material having an index of refraction suitably differing from unity so as to give to the plates the desired dioptric power. As is well-known, these plates are formed on at least one side with a large number of zones of a spherical surface, the centers of these spherical surfaces lying on a common perpendicular to the plate. Such a combination of surfaces may be called a Fresnel surface. Advantageously, for simplicity, the zones of one Fresnel surface are all of spheres of the same radius so that the dioptric power is substantially the same over the entire surface of the plate. The zones may be of very small height, their height having been exaggerated in FIG. 2 for clarity.

Preferably, in accordance with the invention, only one Fresnel surface is formed on each plate, so that none of the plates has a Fresnel surface on both faces thereof. The use of two Fresnel surfaces on a single plate is subject to the disadvantage that undesirable Moire patterns and effects may be produced thereby.

The Fresnel plates are spaced from each other by spacing elements 38 which facilitate the passage of cooling air between those plates.

According to another feature of the invention, the reciprocal of the sum of the powers of the surfaces of the condenser in the meridian plane of the condenser parallel to the long dimension L of the image window, lies between 0.25 and 0.8 times that long dimension L. Denoting this sum of surface powers as $\Phi_L$, this relationship can be expressed as follows:

$$0.25L < 1/\Phi_L < 0.8L$$

Referring to FIG. 2, the power $\Phi_L$ is the sum of the powers, in the meridian plane defined by the system axis and by the line BB shown in FIG. 2, line BB intersecting that axis and being parallel to the long dimension L of the aperture 14 in the mask 16. The system axis does not appear in FIG. 2. It is parallel to the vertical line shown at AA, and passes through the centers of curvature of all of the spherical refracting surfaces in the condenser, i.e., the lower surface $R_1$ of C1 and the spherical surfaces of the Fresnel plates FP1, FP2 and FP3. The meridian plane in question is therefore indicated in FIG. 2 by the lines AA and BB.

Each surface power is given in diopters by the ratio $(n'-n)/R$ wherein $n'$ is the index of refraction of the material following the surface in question, in the sense of light propagation, $n$ is the index of refraction of the material preceding that surface, and R is the radius of curvature of that surface in meters, taken in the meridian of interest.

Further according to the invention, the reciprocal of the sum $\Phi_S$ of the powers of the surfaces of the condenser in the meridian plane of the condenser parallel to the short dimension S of the image window 14 lies between 0.125 and 0.4 times the long dimension L. Expressed algebraically:

$$0.125L < 1/\Phi_S < 0.4L$$

That is to say, the condenser has greater power in the meridian perpendicular to that defined by the lines AA and BB in FIG. 2 than it does in the meridian defined by those lines.

These meridian planes in which the power sums $\Phi_L$ and $\Phi_S$ are taken may be defined without reference to the image window 14 in the mask 16. They may namely be defined as the meridians in which the condenser has minimum and maximum power respectively. These meridians of minimum and maximum power are perpendicular to each other. If the condenser includes a cylindrical refracting surface, as is true of the embodiment illustrated in FIG. 2, the meridian to which the power sum $\Phi_L$ applies will be that containing the system axis as above defined and the axis of that cylindrical surface. If the difference in powers is obtained by the use of a toric surface, the meridian to which the power sum $\Phi_L$ applies will be the meridian in which the toric surface has least power, whereas the meridian to which the power sum $\Phi_S$ applies will be that in which the toric surface has maximum power.

An example of a condenser according to the invention is given in the following table:

| Element | Surface | Power, in diopters, in meridian of minimum power | Power, in diopters, in meridian of maximum power |
|---|---|---|---|
| C1 | $R_1$ | +0.3505 | +0.3505 |
|  | $R_1'$ | 0 | +6.7850 |
| FP1 |  | +3.1500 | +3.1500 |
| FP2 |  | +4.9250 | +4.9250 |
| FP3 |  | +3.1500 | +3.1500 |
| C2 | $R_2$ | 0 | +6.7850 |
|  | $R_2'$ | 0 | 0 |
| Total |  | +11.5755 | +25.1455 |

For the condenser of the table therefore $\Phi_L = +11.5755$ diopters, and $\Phi_S = +25.1455$ diopters.

The condensed of the table accrdingly has in the meridian of minimum power a focal length $f_L$ of 1/11.5755 diopters of 86.39 mm., and in the meridian of maximum power it has a focal length $f_S$ of 1/25.1455 diopters of 39.76 mm. This condenser may advantageously be used with a mask having parallel to the meridian of minimum power an opening of length L equal to 210 mm. With such an opening the ratio of the focal length $f_L$ in the meridian of minimum power to the length L is 86.39/210=0.414, and the ratio of the focal length $f_S$ in the meridian of maximum power to the length L is 39.76/210=0.1893. Substituting the corresponding values into the relation $0.25L < 1/\Phi_L < 0.8L$ gives 52.5 mm. <86.39 mm. <168 mm., which inequality is seen to be true. Similarly, substituting the corresponding values into the relation $0.125L < 1/\Phi_S < 0.4L$ gives 26.25 mm. <39.76 mm. <84 mm., which inequality is also true.

If instead the condenser of the table is used with a mask having an opening of length L equal to 180 mm., the ratio of the focal length $f_L$ in the meridian of minimum power to the length L is 86.39/180=0.4799 and the ratio of the focal length $f_S$ in the meridian of maximum power to the length L is 39.76/180=0.2209. Substituting corresponding values into the relation $$0.25L < 1/\Phi_L < 0.8L$$

gives 45 mm. <86.39 mm. <144 mm., which inequality is seen to be satisfied. Similarly substituting corresponding values into the relation $0.125L < 1/\Phi_S < 0.4L$ gives 22.5 mm. <39.76 mm. <72 mm., which is also satisfied.

In projecting images of objects having a long dimension of the order of from 6 to 11 inches by means of objectives having focal lengths between approximately 6 and 10 inches, the half angles of the edge rays will have tangents ranging from about 0.3 minimum (3/10) to about 0.92 maximum (5.5/6), or a median of about 0.525, since $0.295 \times 10^{1/4} = 0.933 \times 10^{-1/4} = 0.525$.

Figure 3:
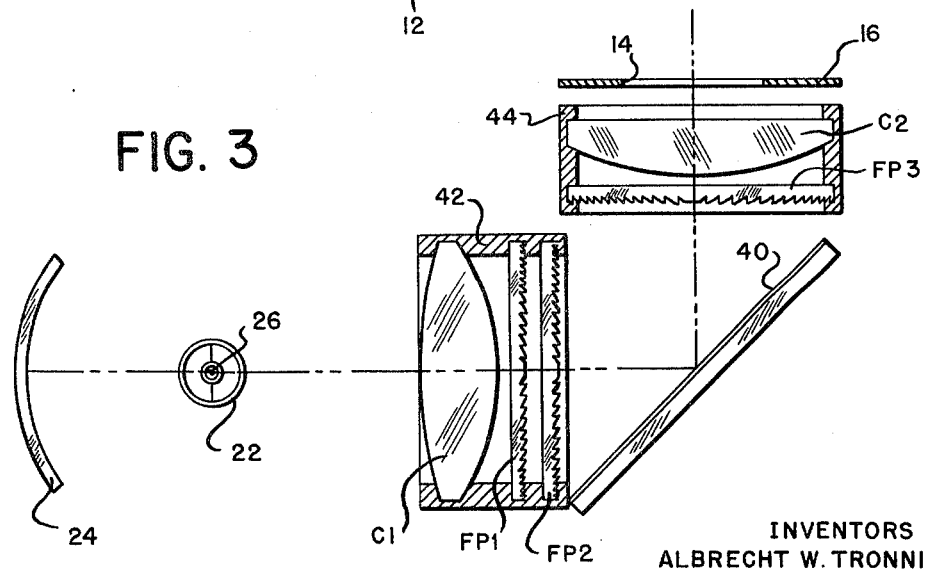

FIG. 3 shows a modified form of construction in which the optical axis of the system is deviated through 90° by means of a first surface mirror 40 constructed to permit transmission therethrough, and hence dissipation to the exterior, of some of the heat falling on it from the lamp 22. A framework 42 is shown holding the elements C1, FP1 and FP2 in fixed relative position, and another framework 44 is shown holding the elements FP3 and C2 in fixed relative position. Similar conventional structure, not shown, supports the elements 42 and 44 and the other elements of FIG. 3 in the relative positions thereshown.

FIG. 4 shows still another embodiment of the invention including a holder 46 pivoted on an axis 48 fixed with respect to the mirror 24 and a condenser 18. The holder 46 supports a plurality of lamps 22 which can be inserted one after another into operating position. In such operating position, the lamp 22 lies with its filament in the meridian of least power of the condenser, the filament extending perpendicularly across the system axis.

According to the invention therefore a condenser comprises two air-spaced lenses having together minimum power in one meridian and maximum power in a meridian perpendicular thereto, and a plurality of Fresnel plates disposed between these lenses. These lenses and plates all possess, parallel to that meridian of minimum power, a length at least as large as the largest dimension parallel to that meridian of minimum power possessed by the object to be illuminated by the condenser, i.e. at least as large as the long dimension L of the opening 14 in the mask 16 in the embodiment illustrated in the drawings. The least dimension of the lenses and Fresnel plates parallel to the meridian of minimum power may therefore approximately be substituted for the dimension L in the criteria of the invention concerning surface power sums. That is to say, in accordance with the invention, the reciprocal of the sum of the surface powers of the lenses and Fresnel plates taken in the meridian of minimum power is between 0.25 and 0.8 times the smallest dimension of those lenses and plates in that meridian of minimum power, and the reciprocal of the sum of those surface powers taken in the meridian of maximum power lies between 0.125 and 0.4 times the said smallest dimension.

While the invention has been described hereinabove in terms of a number of presently preferred embodiments, the invention itself is not limited thereto but rather comprehends all modifications on and departures from those embodiments properly falling within the spirit and scope of the appended claims.

We claim:

1. Apparatus for illumination of a translucent strip-shaped object of which an image is to be formed by projection, said apparatus comprising a plurality of lenses, at least two of said lenses being air-spaced from each other and at least one of said lenses having unequal dioptric power in two perpendicular meridians, and a plurality of Fresnel plates of positive power disposed between said two air-spaced lenses.

2. Apparatus according to claim 1 further including an apertured mask having therein an aperture of long dimension L greater than its short dimension S, said mask being disposed adjacent one of said lenses with said long dimension L extending substantially parallel to the one of said meridians of lesser dioptric power, the reciprocal of the sum of the surface powers of said lenses and Fresnel plates in the said meridian of lesser power lying between 0.25 and 0.8 times the said long dimension L.

3. Apparatus according to claim 2 wherein the reciprocal of the sum of the surface powers of said lenses and Fresnel plates in said meridian of greater power lies between 0.125 and 0.4 times the said long dimension L.

4. Apparatus according to claim 1 wherein each of said Fresnel plates has a substantially plane surface on one side thereof.

5. Apparatus according to claim 1 wherein the said plurality of Fresnel plates is greater than two.

6. Apparatus according to claim 1 wherein said Fresnel plates are air-spaced from each other.

7. Apparatus according to claim 1 including a plane mirror disposed between said air-spaced lenses.

8. Apparatus according to claim 1 including means to support a plurality of elongated lamps movable to a plurality of positions in each of which one of said lamps is disposed with its long dimension in said meridian of lesser power.

9. Apparatus according to claim 1 wherein the reciprocal of the sum of the surface powers of the said lenses and Fresnel plates in the said meridian of lesser power is between 0.25 and 0.8 times the smallest dimension of said lenses and plates in said meridian of lesser power and wherein the reciprocal of the sum of the surface powers of said lenses and plates in the said meridian of greater power lies between 0.125 and 0.4 times the smallest dimension of said lenses and plates in said meridian of lesser power.

References Cited

UNITED STATES PATENTS

| | | | |
|---|---|---|---|
| 1,853,778 | 4/1932 | Rayton | 350—190 |
| 2,140,979 | 12/1938 | Bestele | 353—102 |
| 2,637,242 | 5/1953 | Osterberg et al. | 353—102 |
| 1,333,304 | 3/1920 | Gage & Churchill. | |
| 1,868,521 | 7/1932 | Bucky | 240—11.4 |
| 2,803,163 | 8/1957 | Ulffers. | |
| 3,126,786 | 3/1964 | Appeldorn. | |
| 3,167,998 | 2/1965 | Appeldorn et al. | |
| 3,267,802 | 8/1966 | Noble. | |
| 3,296,923 | 1/1967 | Miles. | |

FOREIGN PATENTS 818,229    8/1959    Great Britain.

NORTON ANSHER, Primary Examiner

R. M. SHEER, Assistant Examiner

U.S. Cl. X.R.

350—189, 211

PO-1050
(5/69)

UNITED STATES PATENT OFFICE
CERTIFICATE OF CORRECTION

Patent No. 3,479,117  Dated November 18, 1969

Inventor(s) Albrecht W. Tronnier et al.

It is certified that error appears in the above-identified patent and that said Letters Patent are hereby corrected as shown below:

Column 2, line 5, for "of" substitute --or--; open quotations before "object";
    line 7, for "taket-up" substitute --take-up--;
    line 16, for "22" substitute --21--.
Column 4, line 20, for "condensed" substitute --condenser--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents